United States Patent Office 3,360,396
Patented Dec. 26, 1967

3,360,396
POLYVINYL FLUORIDE COATING
Alexander W. Kennedy, Cleveland, and Michael E. Kucsma, Painesville, Ohio, assignors to Diamond Alkali Company, Cleveland, Ohio, a corporation of Delaware
No Drawing. Filed May 25, 1964, Ser. No. 370,118
5 Claims. (Cl. 117—132)

ABSTRACT OF THE DISCLOSURE

Adherent polyvinyl fluoride coatings are obtained on unprimed substrates by applying to these substrates a polyvinyl fluoride-latent solvent dispersion coating and subsequently heating this coating to a temperature in excess of 450° F.

---

The present invention relates to an improved process for attaining adhesion of polyvinyl fluoride coatings to substrates. More particularly, the present invention relates to an improved process for coating unprimed substrates with polyvinyl fluoride characterized by excellent adhesion to the substrate without introducing other undesired characteristics to the coating.

Polyvinyl fluoride resins have found extensive use in the coating field because of their combination of desirable properties. For example, coatings of polyvinyl fluoride exhibit resistance to atmospheric elements, to chemicals, water and most solvents; they are free of odor, taste and toxicity; they are strong, flexible and tough and they also possess high finish and durability.

Due to the fact that polyvinyl fluoride deteriorates upon heating prior to its reaching the high temperatures necessary to prepare a coating on the substrate and is insoluble in commonly used volatile solvents, such as acetone, petroleum ether, isooctane, xylene, etc., it has been found necessary to disperse polyvinyl fluoride in the form of discrete particles in a suitable liquid medium which has substantially no solvent action on the polymer at room temperature, but which is capable at elevated temperatures of coalescing the polymer particles.

Dispersions of polyvinyl fluoride have been used to coat various surfaces such as wood, metal and the like, followed by heating at temperature whereby the solvent evaporates and coalescence occurs. However, these coatings from polyvinyl fluoride dispersions have been found totally to lack adhesion to such surfaces. This lack of adherence to the substrate surface has posed a serious problem for the commercial applicability and acceptance of polyvinyl fluoride as a coating material. Attempts have been made to circumvent this problem by first treating the substrate surface, such as metal, before the application of the polyvinyl fluoride coating, i.e., film, with various types of adhesives which are superimposed on the substrate and then applying the coating of polyvinyl fluoride over the adhesive. The adhesive acts as a binder between the polyvinyl fluoride coating and the substrate. Likewise, a primer coating, e.g., an epoxy-type resin, may be applied to the substrate and cured prior to the application of the polyvinyl fluoride dispersion coating system. However, such adhesives and primers have provided a weak link in the polyvinyl fluoride coating system preventing the full use of the outstanding weather resistant, abrasion resistant and solvent resistant properties of the polyvinyl fluoride. The polyvinyl fluoride coating is only as resistant as the adhesive or primer employed. In other words, the polymer layer is dependent upon the strength of the adhesive or primer layer. If the adhesive or primer layer deteriorates, the subsequently applied layer of polymer will not be able to perform its intended function of protecting the surface of the substrate. Thus, whatever merits polyvinyl fluoride has as a coating they are dependent upon the characteristics of the adhesive or primer employed. Also, it is evident that the use of an adhesive or primer layer is a relatively expensive factor because of the necessary material and labor invloved. Accordingly, the coating industry has long been searching for a method of coating an unprimed substrate with a polyvinyl fluoride dispersion which would dispense with the need of using primers and still exhibit weather, abrasion and solvent resistance without the loss of the necessary adhesion to the substrate.

In accordance with the present invention a process has been discovered whereby polyvinyl fluoride dispersion coatings possessing remarkable adhesion are prepared by the simple expedient of curing the applied dispersion on the substrate at an elevated temperature to achieve the desired adhesion in a short period of time. The present invention provides a method for coating various unprimed substrates, particularly smooth-surface substrate, such as metal, by direct application to the unprimed substrate of a polyvinyl fluoride resin in the form of a dispersion and heating the applied dispersion at a temperature in excess of 450° F. The coatings are characterized by excellent adhesion to unprimed substrates and particularly possess outstanding tenacity to smooth unprimed metal surfaces and are flexible, tough and chemically inert. A particularly valuable aspect of the present invention is a metal article of manufacture from which the coatings applied by the method of this invention are not strippable even with a knife. The degree of hardness and flexibility of the coating may be modified as desired to suit best the type of substrate and the ultimate application intended therefore.

Coated articles are prepared by the process of the present invention by applying the vinyl fluoride polymer dispersed in a latent solvent therefor on the surface of the unprimed substrate by any suitable procedure designed to give a coating of the thickness desired. Then the substrate coated with the polyvinyl fluoride dispersion is heat-cured at a temperature sufficient to obtain a highly adherent uniform polyvinyl fluoride coating. The coated substrate is heated at a temperature in excess of 450° F. for a sufficient period of time to effect adhesion of the coating to the unprimed substrate by vaporizing the solvent from the coating leaving the polyvinyl fluoride on the substrate as a coalesced homogeneous structure essentially free of any liquid phase of the original dispersion. Specifically, the coated substrate is subjected to heating at temperatures in the range of about 450° F. up to about 800° F., preferably temperatures within the range of about 500° to 700° F., for a period of time of from about 30 seconds up to about 15 or more minutes, preferably about 2 to 10 minutes, to give a coating of polyvinyl fluoride on an unprimed substrate possessing excellent adhesion and which is flexible, tough and chemically inert.

Although heating techniques previously have been applied in an attempt to achieve satisfactory adhesion of a polyvinyl fluoride coating to the substrate, only moderate adhesion of the polyvinyl fluoride coating to the substrate has been attained employing temperatures below 450° F. even after relatively long periods of time. Prior to this time heating above 450° F. has been avoided to prevent decomposition or deterioration of the polyvinyl fluoride coating and boiling off of the latent solvent from the coating resulting in a nonuniform porous coating due to the bubbling effect as the solvent is vaporized at temperatures above the boiling point of the solvent. Generally, it has been the practice to effect coalescence of the polyvinyl fluoride by heating to a temperature below the boiling point of the latent solvent thereby removing the solvent at a slower rate but without the formation of bubbles thereby resulting in a non-porous coating. It has now been found that highly adherent, non-porous coatings may be prepared by the method of the present invention by effecting coalescence of the polyvinyl fluoride-latent solvent dispersion at a temperature in excess of 450° F.

The polyvinyl fluoride used in the dispersion coating of the present invention can be prepared by the suspension polymerization of vinyl fluoride monomer in an aqueous medium in the presence of a monomer-soluble catalyst and emulsifying agent. The polymerization reaction is conducted under super atmospheric pressure and moderately elevated temperatures with continual high speed agitation. Suitable monomer-soluble catalysts are the organic peroxide compounds and include acyl and diacyl peroxide, e.g., lauroyl, benzoyl, dibenzoyl, benzoyl acetyl and the like. Generally, the monomer-soluble catalyst is present in amounts between about 0.005 to 1% by weight, preferably 0.05 to 1% based on the total weight of the monomer. Exemplary of the emulsifying or suspending agents which may be employed to aid in maintaining the monomer in suspension in the aqueous medium are carboxy methylated cellulose, polyvinyl alcohol, gelatin and the like. The polymerization temperatures employed are generally within the range of about 40 to 150° C., preferably within the range of about 50° to 75° C. with the pressure in excess of about 3000 lbs. per square inch, preferably within the range of about 5000 to 10,000 p.s.i.g.

The polyvinyl fluoride has an intrinsic viscosity of at least about 0.35 and preferably at least about 1. The polymer particles may range in size up to about 30 microns in diameter, preferably the diameter of the polymer particles is below about 20 microns. The size of the polymer particle may be reduced by a variety of means known in the art, such as ball milling or grinding. Although particle sizes as low as 0.005 micron may be employed, it is preferable that the size of the particle be within the range of 0.05 to 5 microns. The particles in a given dispersion need not be uniform in size.

Although the boiling point of latent solvents useful for purposes of this invention may be as low as 100° C. in order to realize shorter fusion times at lower temperatures accepted by industry, generally the more useful latent solvents have boiling points above 120° C. The latent solvent need not necessarily be a liquid at room temperature provided its melting point is not so high that the temperature necessary for liquid blending of latent solvent and polymer subjects the polymer to thermal degradation. It should be thermally stable up to its normal boiling point, or at least up to the temperature necessary to cause coalescence of polymer particles and it should not react chemically with either the polymer or the materials of construction of the process equipment over the heat-curing temperature range employed.

Following are examples of specific compounds representative of the class of latent solvents useful in the process of the present invention: gamma butyrolactone, butadiene cyclic sulfone, tetramethylenesulfone, dimethylsulfolane, hexamethylenesulfone, diallylsulfoxide, dimethylsulfoxide, dicyanobutene, adiponitrile, ethylene carbonate, propylene carbonate, 1,2-butylene carbonate, 2,3-butylene carbonate, isobutylene carbonate, trimethylene carbonate, N,N-diethylformamide, N,N-dimethylacetamide, N,N-dimethylformamide, N,N - dimethyl - gamma - hydroxyacetamide, N,N - dimethyl-gamma-hydroxybutyramide, N,N-diethylacetamide, N,N-dimethylmethoxyacetamide, N-methylacetamide, N-methylformamide, N,N-dimethylaniline, N,N-dimethylethanolamine, 2-piperidone, N-methyl-2-piperidone, N-methyl-2-pyrrolidone, N-ethyl-2-pyrrolidone, N-isopropyl-2-pyrrolidone, 5-methyl-2-pyrrolidone, beta-propiolactone, delta-valerolactone, gamma-valerolactone, alpha-angelica-lactone, beta - angelica - lactone, epsilon-caprolactone, and alpha, beta and gamma-substituted alkyl derivatives of gamma-butyrolactone, gamma-valerolactone and delta-valerolactone, as well as delta-substituted alkyl derivatives of delta-valerolactone, tetramethyl urea, 1-nitropropane, 2-nitropropane, acetonyl acetone, acetophenone, acetyl acetone, cyclohexanone, diacetone alcohol, dibutyl ketone, isophorone, mesityl oxide, methylamyl ketone, 3-methylcyclohexanone, bis-(methoxy-methyl)uron, methylacetylsalicylate, diethyl phosphate, dimethyl phthalate, ethyl acetoacetate, methyl benzoate, methylene diacetate, methyl salicylate, phenyl acetate, triethyl phosphate, tris(morpholino)phosphine oxide, N-acetylmorpholine, N-acetylpiperidine, isoquinoline, quinoline, pyridine and tris(dimethylamide)phosphate.

The polyvinyl fluoride-latent solvent dispersion may be prepared by blending the polyvinyl fluoride with latent solvent in a wide variety of mixing equipment, including Hobart mixers, Waring Blendors, ball mills, colloid mills and sand grinding equipment. The fluidity of the composition may vary greatly depending on the type of appication and the method of application desired. The amount of latent solvent is adjusted to give a fluid or sometimes viscous composition that is of suitable consistency for application to the substrate. This, of course, will vary greatly according to the manner of application; for instance, whether it is desired to spray the composition on the substrate, to dip the substrate into the composition or to apply the composition on the substrate with some kind of roller system, as well as other factors like the temperature, the type of liquid dispersants employed and the like. Generally, about 25 to 400 parts, by weight, of latent solvent per 100 parts of polyvinyl fluoride are suitable with a preferred range of about 50 to 300 parts latent solvent to the weight of the polymer.

The polyvinyl fluoride-latent solvent dispersion may be applied onto the surface of the substrate to give a wet coating of up to about 30 mils thickness. The dry coatings generally have a thickness of about 1 to 5 mils. A great variety of unprimed substrates may be coated in accordance with this invention. Illustrations are materials like leather, cloth, plastics, wood, stones, concrete and cement. The present coatings are of special interest for metals since the problem of adhesion on unprimed metals has been so acute until the present discovery. Any metal may be coated with the present composition, including steel, aluminum, iron, magnesium and nickel and any alloy thereof.

Besides the polyvinyl fluoride, the coating may contain plasticizers, pigments, fillers, stabilizers, fungicides, and other additives necessary to meet specifications of industry, provided that these additives do not themselves deteriorate or decompose or contribute to the deterioration of decomposition of the polyvinyl fluoride dispersion system at the high temperatures employed in the heat-curing to achieve the adhesion desired. Especially preferred polyvinyl fluoride dispersion coating systems are disclosed in copending patent application Ser. No. 370,075 filed May 25, 1964, now U.S. Patent No. 3,320,206, hereby incorporated by reference. In addition to the resin and latent solvent the polyvinyl fluoride dispersion coatings disclosed therein contain a pigment and a stabilizer system comprising a polyhydroxy compound in conjunction with an ester of a thiodialkanoic acid.

In addition to the homopolymers of vinyl fluoride there may be employed copolymers of vinyl fluoride with other monoethylenically unsaturated monomers, copolymerizable therewith, wherein the vinyl fluoride is present in substantial or in major amounts, i.e., at least 75 to 80% of the total by weight. Examples are monoethylenic hydrocarbons, e.g., ethylene, propylene, isobutylene and styrene; halogen-substituted mono-ethylenic hydrocarbons, e.g., vinyl chloride, vinyl bromide, 1,1-dichloroethylene, 1,1-difluoroethylene, difluorochloroethylene, trifluorochloroethylene, tetrachloroethylene, trifluoropropylene, difluoroisobutylene; vinyl esters, e.g., vinyl formate, vinyl acetate, vinyl propionate, vinyl butyrate, vinyl benzoate, vinyl pivalate, vinyl stearate, vinyl salicylate and vinyl esters of inorganic acids; vinyl ethers, e.g., vinyl ethyl ether, tetrafluoroethyl allyl ether and vinyl dioxolane; vinyl ketones, e.g., methyl vinyl ketone; N-vinyl imides, e.g., N-vinyl succinimide and N-vinyl phthalimide; acrylic and methacrylic acids and their derivatives, e.g., esters, nitriles, amides, anhydrides and acid halides, including methyl methacrylate, beta-hydroxyethyl methacrylate, allyl methacrylate, acrylonitrile, N-butyl methacrylamide, etc.; derivatives of maleic and fumaric acids, e.g., diethylmaleate and dimethylfumarate; propenyl esters; e.g., allyl acetate, isopropenyl acetate, etc. The presence in these copolymers of even a small percentage of a comonomer which, as a homopolymer, is normally more soluble in the selected latent solvent than is the homopolymer of vinyl fluoride, may render said copolymer sufficiently more soluble in aforementioned latent solvent as to permit its application in the form of a dispersion on a substrate. Such a dispersion may require considerably less solvent than is needed for the fusion of homopolymers of vinyl fluoride. Also, the use of these vinyl fluoride copolymers permits achieving acceptable adhesion of the vinyl fluoride dispersion coating at temperatures lower than that disclosed hereinabove. Adhesion of dispersion coatings of vinyl fluoride comonomers may be achieved at heat-curing temperatures within the range of about 350° to 450° F.

In order that those skilled in the art may more completely understand the present invention and the preferred method by which the same may be carried into effect, the following specific examples are offered.

*Example 1*

A series of anodized aluminum panels, (6 x 12") chromate-treated (supplied by Q-Panel Company, Cleveland, Ohio), are coated with a polyvinyl fluoride dispersion containing 30%, by weight, polyvinyl fluoride, 0.15%, by weight, dipentaerythritol and the latent solvent dimethylacetamide. Each of the coated aluminum samples is then heated to cure the applied dispersion coating. The temperatures, time of cure and adhesion ratings are reported in Table I below.

TABLE I

| Run | Temperature, °F. | Time, Minutes | Adhesion Rating * |
|---|---|---|---|
| 1 | 400 | 10 | 0.5 |
| 2 | 450 | 4 | 1.0 |
| 3 | 450 | 6 | 2.5 |
| 4 | 450 | 8 | 3.0 |
| 5 | 500 | 2 | 1.0 |
| 6 | 500 | 2¾ | 2.0 |
| 7 | 500 | 3¼ | 3.0 |
| 8 | 525 | 2 | 1.5 |
| 9 | 525 | 4 | 3.0 |
| 10 | 550 | 1 | 1.0 |
| 11 | 550 | 3 | 3.0 |

* 1.0=Poor adhesion. Coating can easily be peeled from the substrate. 2.0=Good adhesion. Coating can be peeled only with difficulty using a sharp-edged instrument. 3.0=Excellent adhesion. Coating cannot be cleanly chipped, scraped, nor peeled from the substrate at the coating-aluminum interface.

It can be seen that at 400° F. adhesion of the polyvinyl fluoride coating is not obtained even after a curing period of 10 minutes. At 450° F. good adhesion is obtained at a curing time of 6 minutes and excellent adhesion at 8 minutes. As the temperature is increased adhesion is attained at shorter curing times, as evidenced by a comparison of runs 4, 7 and 11.

*Example 2*

Polyvinyl fluoride resin having particle sizes of less than 10 microns and an intrinsic viscosity between 1 and 1.3 is dispersed in dimethylacetamide to give a solid content of polyvinyl fluoride of 20%, by weight, based on the dimethylacetamide. The dispersion of polyvinyl fluoride and dimethylacetamide is applied to a series of anodized aluminum panels (6 x 12") to give a dried coating thickness after heat curing of 1 to 2 mils. The coated aluminum panels are then heat-cured. Temperatures, time of heat cure and adhesion ratings are reported in Table II, below.

*Example 3*

Example 2 is repeated except that the polyvinyl fluoride-dimethylacetamide dispersion contains 23%, by weight, polyvinyl fluoride. The pertinent data are reported in Table II, below.

*Example 4*

Example 2 is repeated except that the polyvinyl fluoride-dimethylacetamide dispersion contains about 25%, by weight, polyvinyl fluoride. The pertinent data are reported in Table II, below.

*Example 5*

Example 2 is repeated except that the polyvinyl fluoridedimethylacetamide dispersion contains 30%, by weight, of the polyvinyl fluoride. The pertinent data are reported in Table II,

TABLE II

| Run | Temperature °F. | Time, Min. | Adhesion Rating * |
|---|---|---|---|
| EXAMPLE II | | | |
| 1 | 375 | 2 | 0.5 |
| 2 | 375 | 3 | 0.5 |
| 3 | 425 | 2 | 1 |
| 4 | 425 | 4 | 2 |
| 5 | 475 | 1 | 2 |
| 6 | 475 | 2 | 2.5 |
| 7 | 475 | 4 | 3 |
| 8 | 505 | 1 | 2 |
| 9 | 510 | 2 | 3 |
| EXAMPLE III | | | |
| 1 | 400 | 6 | 2 |
| 2 | 450 | 3 | 2 |
| 3 | 500 | 2 | 2.5 |
| 4 | 500 | 3 | 3 |
| 5 | 525 | 2 | 2 |
| 6 | 525 | 2½ | 2.5 |
| EXAMPLE IV | | | |
| 1 | 380 | 4 | 1 |
| 2 | 380 | 8 | 1.5 |
| 3 | 430 | 2 | 1 |
| 4 | 430 | 4 | 2.5 |
| 5 | 500 | 1 | 1 |
| 6 | 500 | 2 | 3 |
| EXAMPLE V | | | |
| 1 | 425 | 10 | 2 |
| 2 | 450 | 3 | 2 |
| 3 | 450 | 5 | 2.5 |
| 4 | 450 | 8 | 2.5 |
| 5 | 475 | 2 | 1.5 |
| 6 | 475 | 3 | 2 |
| 7 | 475 | 4 | 3 |
| 8 | 500 | 2 | 2.5 |
| 9 | 500 | 3 | 3 |
| 10 | 525 | 1½ | 2 |

* 1.0=Poor adhesion. Coating can be easily peeled from the substrate. 2.0=Good adhesion. Coating can be peeled only with difficulty using a sharp edged instrument. 3.0=Excellent adhesion. Coating cannot be cleanly chipped, scraped, nor peeled from the substrate at the coating aluminum interface.

It is to be understood that although the invention has been described with specific reference to particular embodiments thereof, it is not to be so limited since changes and alterations therein may be made which are within the full intended scope of this invention as defined in the appended claims.

It is claimed:

1. A process of coating an unprimed substrate which comprises applying to said substrate a polyvinyl fluoride-latent solvent dispersion coating, heating said applied polyvinyl fluoride-latent solvent dispersion coating to a temperature in excess of 450° F. and maintaining said temperature for a period of time sufficient to effect adhesion of said coating to said substrate.

2. The method of claim 1 wherein the unprimed substrate surface is metal.

3. The method of claim 1 wherein the coating is heated to a temperature within the range of about 450° F. to 800° F.

4. The method of claim 3 wherein the coating is heated to a temperature within the range of about 500° F. to 700° F.

5. The method of claim 1 wherein the coated substrate is heated to a temperature in excess of 450° F. and is maintained at said temperature for a period of time up to about 15 minutes.

References Cited
UNITED STATES PATENTS 2,604,751  7/1952  Haley _____ 117—132

RALPH S. KENDALL, *Primary Examiner.*

Certificate

Patent No. 3,360,396        Patented December 26, 1967

Alexander W. Kennedy and Michael E. Kucsma

Application having been made by Alexander W. Kennedy and Michael E. Kucsma, the inventors named in the patent above identified, and Diamond Alkali Company, Cleveland, Ohio, a corporation of Delaware, the assignee, for the issuance of a certificate under the provisions of Title 35, Section 256, of the United States Code, deleting the name of Alexander W. Kennedy as a joint inventor, and a showing and proof of facts satisfying the requirements of the said section having been submitted, it is this 29th day of June 1971, certified that the name of the said Alexander W. Kennedy is hereby deleted from the said patent as a joint inventor with said Michael E. Kucsma.

FRED W. SHERLING
*Associate Solicitor.*